United States Patent
Yang et al.

(10) Patent No.: US 12,483,683 B2
(45) Date of Patent: *Nov. 25, 2025

(54) INTERACTIVE INFORMATION PROCESSING METHOD, DEVICE AND MEDIUM

(71) Applicant: BEIJING ZITIAO NETWORK TECHNOLOGY CO., LTD., Beijing (CN)

(72) Inventors: Jingsheng Yang, Beijing (CN); Kojung Chen, Beijing (CN); Jinghui Liu, Beijing (CN); Mengyuan Xiong, Beijing (CN); Xiang Zheng, Beijing (CN); Cheng Qian, Beijing (CN); Xiao Han, Beijing (CN); Li Zhao, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/415,223

(22) Filed: Jan. 17, 2024

(65) Prior Publication Data

US 2024/0155092 A1  May 9, 2024

Related U.S. Application Data

(63) Continuation of application No. 17/683,158, filed on Feb. 28, 2022, now Pat. No. 11,917,344, which is a (Continued)

(30) Foreign Application Priority Data

Sep. 29, 2020 (CN) .......................... 202011057348.6

(51) Int. Cl.
*G06F 16/48* (2019.01)
*G06F 3/16* (2006.01)
(Continued)

(52) U.S. Cl.
CPC ........... *H04N 9/8715* (2013.01); *G06F 3/165* (2013.01); *G06F 16/489* (2019.01); *G06F 40/58* (2020.01);
(Continued)

(58) Field of Classification Search
CPC ..... H04N 9/8715; G06F 3/165; G06F 16/489; G06F 40/58; G06F 3/167; G06F 16/432;
(Continued)

(56) References Cited

U.S. PATENT DOCUMENTS 11,917,344 B2 * 2/2024 Yang ..................... G06F 16/432
2003/0174160 A1 9/2003 Deutscher et al.
(Continued)

FOREIGN PATENT DOCUMENTS

CN   103226947 A   7/2013
CN   106295628 A   1/2017
(Continued)

OTHER PUBLICATIONS

"Microsoft Stream: Automatic subtitle transcription finally supports Japanese! You can also cut the video frequency!", website link: https://web.archive.org/web/20200922183922/https://art/break.net/tech/?p=6808, 2024, pp. 1-12.
(Continued)

*Primary Examiner* — Thierry L Pham

(57) ABSTRACT

Disclosed are an interactive information processing method, an electronic device and a storage medium. The method includes establishing a correspondence between a multimedia data stream and a display text generated based on the multimedia data stream; presenting the multimedia data
(Continued)

stream and the display text based on the correspondence; and in response to detecting a triggering operation triggering a display content in the display text, adjusting, based on a timestamp corresponding to the display content and the correspondence, the multimedia data stream to navigate to a playback position corresponding to the display content; the display content comprises a text corresponding to speech in the multimedia data stream; and the display text and the multimedia data stream are displayed on different display areas of a page respectively, and a display area occupied by the display text is not superimposed on a display area occupied by the multimedia data stream.

17 Claims, 5 Drawing Sheets

Related U.S. Application Data continuation of application No. PCT/CN2021/116826, filed on Sep. 7, 2021.

(51) Int. Cl.
- *G06F 40/58* (2020.01)
- *G06V 20/40* (2022.01)
- *G06V 30/19* (2022.01)
- *G10L 17/06* (2013.01)
- *G10L 25/57* (2013.01)
- *H04N 9/87* (2006.01)

(52) U.S. Cl.
CPC .............. *G06V 20/40* (2022.01); *G06V 30/19* (2022.01); *G10L 17/06* (2013.01); *G10L 25/57* (2013.01)

(58) Field of Classification Search
CPC ...... G06F 16/483; G06V 20/40; G06V 30/19; G06V 20/46; G06V 20/62; G10L 17/06; G10L 25/57; G10L 15/26; G10L 17/00
USPC ......................................................... 715/203
See application file for complete search history.

(56) References Cited

U.S. PATENT DOCUMENTS

| | | |
|---|---|---|
| 2015/0149171 A1 | 5/2015 | Goldman et al. |
| 2016/0284354 A1 | 9/2016 | Chen et al. |
| 2020/0411013 A1 | 12/2020 | Horton et al. |
| 2022/0030286 A1 | 1/2022 | Muthiah |

FOREIGN PATENT DOCUMENTS

| | | | | |
|---|---|---|---|---|
| CN | 107749313 A | * | 3/2018 | ............. G10L 15/04 |
| CN | 107864410 A | | 3/2018 | |
| CN | 109634700 A | * | 4/2019 | |
| CN | 110740283 A | | 1/2020 | |
| CN | 111008300 A | | 4/2020 | |
| CN | 112231498 A | | 1/2021 | |
| JP | 2002-099530 A | | 4/2002 | |
| JP | 2004-326473 A | | 11/2004 | |
| JP | 2017-215931 A | | 12/2017 | |
| JP | 2019-061594 A | | 4/2019 | |
| WO | 2005/027092 | | 3/2005 | |

OTHER PUBLICATIONS

European Search Report for EP Patent Application No. 21874194.0, Issued on Jan. 23, 2024, 4 pages.
Office action received from Japanese patent application No. 2023-511951 mailed on Feb. 13, 2024, 18 pages (9 pages English Translation and 9 pages Original Copy).
International Search Report for International Application No. PCT/CN2021/116826, mailed Dec. 1, 2021, 05 Pages.
Written Opinion for International Application No. PCT/CN2021/116826, mailed Dec. 1, 2021, 09 Pages.

* cited by examiner

INTERACTIVE INFORMATION PROCESSING METHOD, DEVICE AND MEDIUM

CROSS-REFERENCE TO RELATED APPLICATIONS

This is a Continuation application of U.S. patent application Ser. No. 17/683,158 which is a U.S. National Stage Application of International Patent Application No. PCT/CN2021/116826, filed on Sep. 7, 2021, which claims priority to Chinese patent application No. 202011057348.6 filed with the China National Intellectual Property Administration (CNIPA) on Sep. 29, 2020, disclosures of which are incorporated herein by reference in their entireties.

TECHNICAL FIELD

Embodiments of the present disclosure relate to the field of computer data processing technologies, for example, to an interactive information processing method, a device and a medium.

BACKGROUND

At present, users may view corresponding audio-video frames based on multimedia data streams, or view corresponding content based on text information converted by the multimedia data streams.

According to the above manner, the viewed multimedia data stream and the viewed text information are independent of each other, and the corresponding multimedia data streams cannot be quickly positioned according to the text content, resulting in that the user needs to search for the video frame corresponding to the text content from the multimedia data streams, thus the search efficiency is low and the user experience is poor.

SUMMARY

The embodiments of the present disclosure provide an interactive information processing method and apparatus, a device and a medium to achieve a position linkage between a multimedia data stream and a display text, thereby improving the technical effect of the reading convenience and high efficiency.

The embodiments of the present disclosure provide an interactive information processing method. The method includes steps described below.

A position correspondence is established between a display text generated based on a multimedia data stream and the multimedia data stream.

The display text and the multimedia data stream corresponding to the display text are presented based on the position correspondence.

The embodiments of the present disclosure provide an interactive information display method. The method includes steps described below.

A display text generated based on a multimedia data stream is displayed on a first display region of a target page.

The multimedia data stream is displayed on a second display region of the target page.

A position correspondence is provided between the display text and the multimedia data stream.

The embodiments of the present disclosure further provide an interactive information processing apparatus. The apparatus includes a correspondence establishment module and a content presentation module.

The correspondence establishment module is configured to establish a position correspondence between a display text generated based on a multimedia data stream and the multimedia data stream.

The content presentation module is configured to present the display text and the multimedia data stream corresponding to the display text based on the position correspondence.

The embodiments of the present disclosure further provide an electronic device, and the electronic device includes one or more processors and a storage apparatus.

The storage apparatus is configured to store one or more programs.

When the one or more programs are executed by the one or more processors, the one or more processors implement the interactive information processing method according to any one of the embodiments of the present disclosure.

The embodiments of the present disclosure further provide a storage medium including a computer-executable instruction. When executed by a computer processor, the computer-executable instruction is configured to execute the interactive information processing method according to any one of the embodiments of the present disclosure.

BRIEF DESCRIPTION OF DRAWINGS

Same or similar reference numerals in the drawings denote the same or similar elements. It should be understood that the drawings are schematic and that the components and elements are not necessarily drawn to scale.

DETAILED DESCRIPTION

Figure 1:
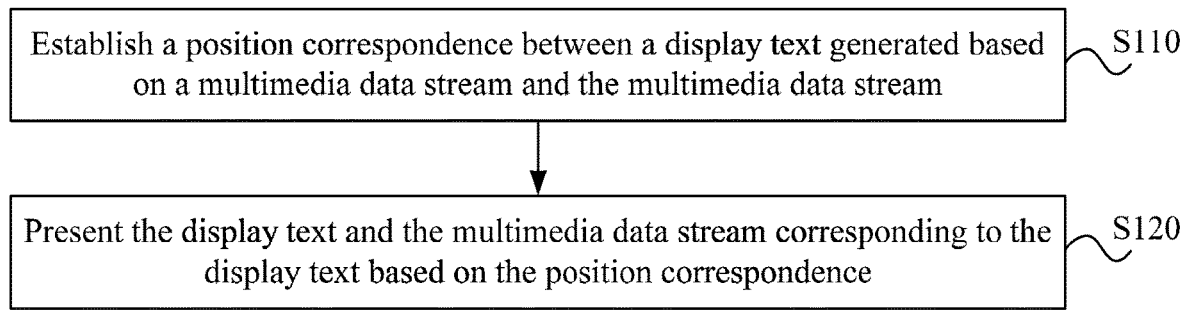
FIG. 1 is a flowchart of an interactive information processing method according to an embodiment of the present disclosure.

Embodiments of the present disclosure are described in more detail hereinafter with reference to the drawings. Although some embodiments of the present disclosure are shown in the drawings, it is to be understood that the present disclosure may be implemented in various forms and should not be construed as limited to the embodiments set forth herein; conversely, these embodiments are provided so that the present disclosure will be thoroughly and completely understood. It should be understood that the drawings and embodiments of the present disclosure are merely illustrative and are not intended to limit the scope of the present disclosure.

It should be understood that the various steps recited in the method embodiments of the present disclosure may be performed in a different order, and/or in parallel. Additionally, the method embodiments may include an additional step and/or omit performing an illustrated step. The scope of the present disclosure is not limited in this respect.

As used herein, the term "include" and variations thereof are intended to be inclusive, that is, "including, but not limited to". The term "based on" is "at least partially based on". The term "one embodiment" means "at least one embodiment"; the term "another embodiment" means "at least one another embodiment"; the term "some embodiments" means "at least some embodiments". Related definitions of other terms are given in the description hereinafter.

It is to be noted that references to "first", "second" and the like in the present disclosure are merely intended to distinguish one from another apparatus, module, or unit and are not intended to limit the order or interrelationship of the functions performed by the apparatus, module, or unit.

It is to be noted that references to modifications of "one" or "a plurality" mentioned in the present disclosure are intended to be illustrative and not limiting; those skilled in the art should understand that "one" or "a plurality" should be understood as "one or more" unless clearly expressed in the context.

FIG. 1 is a flowchart of an interactive information processing method according to an embodiment of the present disclosure. The embodiment of the present disclosure is suitable for establishing a position linkage between a multimedia data stream and a display text, so as to achieve the linkage between the display text and the multimedia data stream when the display text or the multimedia data stream is triggered to be displayed. The method may be executed by an interactive information processing apparatus. The apparatus may be implemented by software and/or hardware, for example, by an electronic device. The electronic device may be a mobile terminal, a personal computer (PC) side, a server terminal, or the like. The method provided in this embodiment may be executed by a client, by a server terminal, or by both.

As shown in FIG. 1, the method in this embodiment includes the steps described below.

In S110, a position correspondence is established between a display text generated based on a multimedia data stream and the multimedia data stream.

The multimedia data stream may be audio-video stream data corresponding to a real-time interactive interface, or video stream data in a recording screen video after a real-time interactive interface is recorded. The real-time interactive interface is any interactive interface in a real-time interactive application scenario. The real-time interactive scenario may be implemented by means of the Internet and a computer, for example, an interactive application program implemented through a native program or a web program, etc. An audio frame of the multimedia data stream may be processed, for example, audio information is extracted from the audio frame to obtain text information corresponding to the multimedia data stream, and the text information is displayed on a target page. Correspondingly, the text information displayed on the target page is the display text. In order to achieve the effect of a synchronous linkage between the display text and the multimedia data stream, the position correspondence between the display text and the multimedia data stream may be established. The position correspondence may be determined based on the timestamp. For example, in some application scenarios, the display text may be obtained by performing the speech recognition on speech in the multimedia data stream. In these application scenarios, a position of the speech, which corresponds to a certain paragraph of characters in the display text, in the multimedia data stream may be used as a timestamp of the paragraph of characters, and a position correspondence between the paragraph of characters and the corresponding speech may be established.

In S120, the display text and the multimedia data stream corresponding to the display text are presented based on the position correspondence.

For example, the display text and the multimedia data stream between which the position correspondence has been established may be displayed on the target page. Thus, when a triggering operation (e.g. a click, etc.) on a certain part of the display text is detected, a video frame corresponding to the display text may be displayed according to the position correspondence.

In the technical scheme of the embodiments of the present disclosure, the position correspondence is established between the multimedia data stream and the display text, and when triggering the target content of the display text is detected, the multimedia data stream may be jumped to the video frame corresponding to the target content, so that a user can understand speech information of a speaking user by combining the video frame and the target content, thus improving the technical effect of the interaction efficiency.

Figure 2:
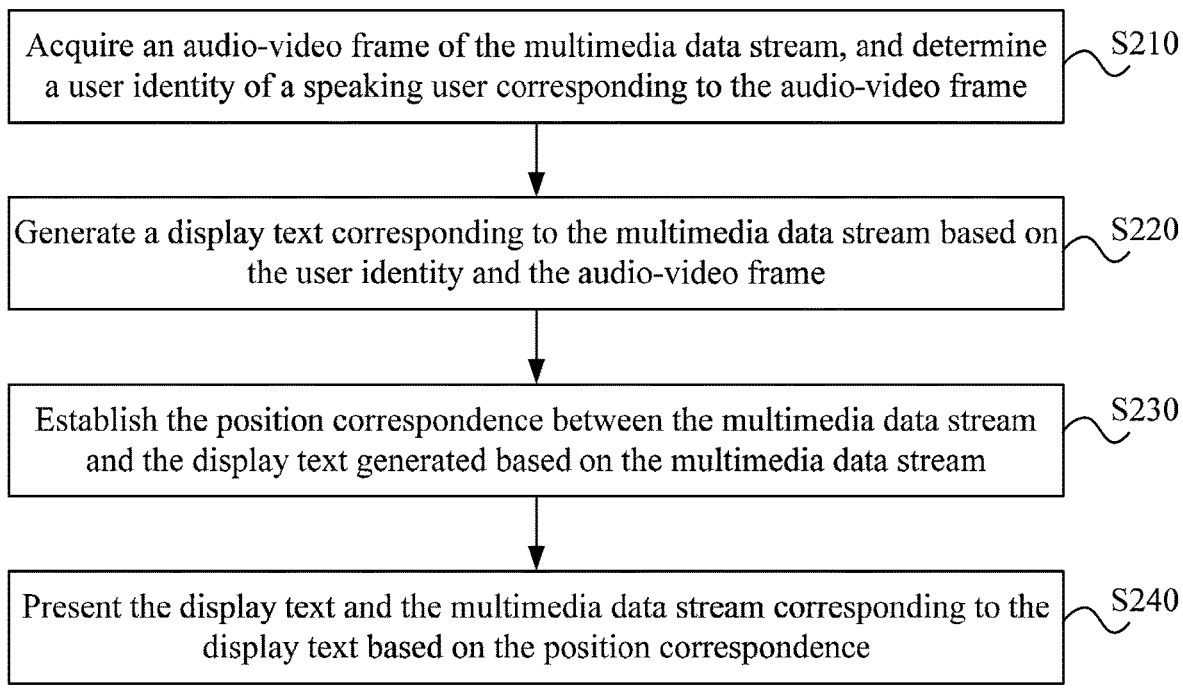
FIG. 2 is a flowchart of an interactive information processing method according to another embodiment of the present disclosure.

FIG. 2 is a flowchart of an interactive information processing method according to another embodiment of the present disclosure. On the basis of the preceding embodiment, the corresponding display text is generated according to the multimedia data stream to establish a position correspondence between the display text and the multimedia data stream. Technical terms identical to or corresponding to the preceding embodiments are not repeated here.

As shown in FIG. 2, the method includes the steps below.

In S210, an audio-video frame of the multimedia data stream is acquired, and a user identity of a speaking user corresponding to the audio-video frame is determined.

The multimedia data stream refers to a data stream acquired from a real-time interactive interface. An interactive scenario achieved by a plurality of users based on the Internet or a computer is used as the real-time interactive scenario, for example, a multi-participant video conference, a live broadcast and the like. After the real-time interaction, to conveniently review the conference content or determine the core idea corresponding to the speech made by one or several speaking users, the real-time interactive scenario may be recorded during the real-time interaction process, for example, the video conference content may be recorded. The recorded real-time interactive scenario is used as a recording screen video. Correspondingly, the multimedia data stream is acquired based on the recording screen video. The recording screen video includes not only audio information of each speaker, but also video information, that is, the multimedia data stream corresponds to audio frames and video frames. The user identity is used for representing the identity of each user.

For example, a user corresponding to a terminal to which the audio information belongs may be determined based on the audio frames and the video frames of the multimedia data stream, and then the user identity of the speaking user corresponding to the audio frames and/or the video frames may be determined.

In S220, a display text corresponding to the multimedia data stream is generated based on the user identity and the audio-video frame.

The literal expression corresponding to an audio frame may be determined based on the audio information, i.e., the audio frame, of the multimedia data stream. A video frame of the multimedia data stream may be a document shared by an interactive user, a shared screen, etc. Information such as literal information and/or links on a display interface may be determined based on the video frame. The display text corresponding to the recording screen video may be determined based on the audio frame and the video frame. The correspondence may be a correspondence between the timestamp of the multimedia data stream and the timestamp in the display text. The target page may be a page displayed on the client. The page may include the multimedia data stream and the display text.

For example, the audio frames and the video frames of the multimedia data stream may be processed to obtain the literal expression corresponding to each audio frame and/or each video frame. The display text corresponding to the multimedia data stream is generated based on the user identity and the timestamp corresponding to each audio-video frame. To achieve a linkage between the display text and the multimedia data stream, the position correspondence between the multimedia data stream and the display text may be established. For example, the multimedia data stream is acquired based on the recording screen video. When it is detected that a progress bar of the recording screen video on the target page is triggered, a playback moment corresponding to the current video frame may be determined, and a text content corresponding to the playback moment may be displayed differentially in the displayed text.

In S230, the audio-video frame of the multimedia data stream is acquired, and the user identity of the speaking user corresponding to the audio-video frame is determined.

In S240, the display text and the multimedia data stream corresponding to the display text are presented based on the position correspondence.

The technical scheme of the embodiments of the present disclosure, by processing the audio-video frame of the multimedia data stream, the text information corresponding to the multimedia data stream may be generated and displayed on the target page. Through the position correspondence between the multimedia data stream and the text information displayed on the target page, a timestamp synchronization correspondence between the multimedia data stream and the display text is achieved, and the synchronization between the text reading and video watching of users is improved, thus improving the user experience.

In this embodiment, determining the user identity of the speaking user corresponding to the audio frame based on the audio frame of the multimedia data stream includes determining the user identity of the speaking user by performing the voiceprint recognition on the audio frame; and/or, determining a client identity of a client to which the audio frame belongs, and determining the user identity of the speaking user based on the client identity.

Generally, the voiceprint recognition is a kind of biometric recognition, which is used for identifying the identity according to acoustic characteristics of the speaking user. Since the language of each speaking user has a unique voiceprint, speaking users with different identities may be identified accordingly. Of course, the identity of the client to which each speaking user belongs may also be collected, and the user identity of each speaking user is determined based on the identity of the client.

For example, the acoustic characteristic processing may be performed on the audio frames in the multimedia data stream, and the user identity of each speaking user is determined according to a processing result. Generally, a client has its corresponding client account or client identity (ID) for distinguishing different clients. Therefore, the client to which each speaking user belongs is acquired, and the user identity corresponding to each speaking user may be determined based on the identity of the client. However, when multiple users speak on a certain client at the same time, the multiple users cannot be distinguished through the client ID. Therefore, the voiceprint recognition may be further performed on voice data of each user, and the voice of each person has a unique voiceprint, so that different users can be distinguished according to the voiceprint. Then the multiple uses may be marked as a client ID-user A and a client ID-user B, respectively, so as to distinguish identity information of different speaking users on the same client, that is, the user identity.

In this embodiment, the identity information of different speaking users is determined. After the audio information of each speaking user is converted into characters, the speaking user corresponding to the literal content may be determined, thereby facilitating other users to determine the core idea expressed by the speaking user corresponding to the speaking content, thereby achieving the technical effect of improving the interaction efficiency.

On the basis of the preceding technical schemes, generating the display text based on the user identity and the audio-video frame includes obtaining a literal expression corresponding to the audio frame by performing the speech-to-text processing on the audio frame, and generating a first display text in the display text based on the literal expression and the user identity; and obtaining characters in the video frame by performing an image-text recognition on the video frame, and generating a second display text in the display text based on the characters and the user identity.

For example, the audio frame in the recording screen video may be converted into the corresponding literal expression based on a speech-to-text module. The first display text in the display text may be generated based on the identity of the speaking user corresponding to the literal presentation and the audio. That is, the display text includes at least one display text, and each of the at least one display text may display the corresponding content. For example, the content displayed in the first display text may be characters generated based on the audio frame. After characters in a video image are determined based on the video frame, the second display text in the display text may be determined based on the characters in the video frame, that is, the second display text displays the content corresponding to the video image. Exemplarily, if the speaking user A shares a screen, the literal content in the screen may be recognized, and the literal content is displayed in the second display text.

It should be noted that the processed content for the audio frame and the video frame may be uniformly displayed in the same text, so the first display text and the second display text are the same.

In this embodiment, the content corresponding to the audio-video frame is displayed in the display text, and the audio frame of each speaking user in the recording screen video may be intuitively displayed as corresponding characters, thus improving the convenience of determining the speaking content of the speaking user.

On the basis of the preceding technical schemes, obtaining the literal expression corresponding to the audio frame by performing the speech-to-text processing on the audio frame, and generating the first display text in the display text based on the literal expression and the user identity include determining the literal expression corresponding to the audio frame, a timestamp currently corresponding to the audio frame and a user identity of a speaking user to which the audio frame belongs, and generating one piece of display content in the display text based on the user identity, the timestamp and the literal expression.

It should be noted that the display text includes at least one piece of display content. When the speaking user speaks, speech information of the speaking user may be converted into a corresponding literal expression. One piece of display content in the first display text may be generated based on a timestamp of the speech information of the speaking user and literal information corresponding to the speech information.

For example, for continuous audio frames, when the continuous audio frames belong to the same speaking user, the literal expression corresponding to the continuous audio frames, a user identity corresponding to the continuous audio frames and timestamps corresponding to the continuous audio frames are determined, and one piece of display content in the first display text may be generated.

It should be noted that the first display text may include multiple pieces of display content, each piece of the display content includes a speaking user identity, a speaking timestamp and specific speaking content, and the user identity corresponding to each piece of display content may be the same or different, but the timestamp corresponding to each piece of display content is different.

In order to improve the readability of the display content in the display text, one piece of display content may include at least two display paragraphs. For example, obtaining the literal expression corresponding to the audio frame by performing the speech-to-text processing on the audio frame, and generating the first display text in the display text based on the literal expression and the user identity include generating a next paragraph in the display content based on the latter audio frame in the process of performing the speech-to-text processing on the audio frame, when it is detected that an interval duration between adjacent audio frames is greater than or equal to a preset interval duration threshold and a user identity of a latter audio frame of the adjacent audio frames is not changed.

That is, when the speech-to-text processing is performed on the audio frame, the interval duration between two adjacent audio frames may be acquired. When the interval duration is less than the preset interval duration threshold, it represents that two audio frames are continuous audio frames. When the interval duration is greater than or equal to the preset interval duration threshold and the user identity of the latter audio frame of the two adjacent audio frames is not changed, it represents that the speaking user is not changed and only a pause exists in the speaking process. Based on the content corresponding to the latter audio frame, it may be determined whether the content corresponding to the latter audio frame is generated into the next paragraph in the display content. That is, after the speech content corresponding to the later audio frame is detected, the speech content may be combined with the speech content corresponding to previous audio frames for performing the semantic analysis, and the speech content may be used as one paragraph or two paragraphs according to an analysis result. This can facilitate other users to understand the speech content of the speaking user, thereby improving the high efficiency of understanding the speech content.

In order to quickly determine the speaking user corresponding to the display content in the first display text, not only an identity of a user may be determined, but also a user avatar corresponding to each speaking user may be determined. Based on the user avatar, the speaking user corresponding to the literal content in the display text may be further quickly determined. For example, a user portrait corresponding to the user identity is acquired, and one piece of display content in the display text is generated based on the user portrait, the user identity, the timestamp and the literal expression.

It can be understood that each piece of display content may include the user avatar, the speaking timestamp (corresponding to a timestamp of the speaking user speaking in the recording screen video), and characters corresponding to the audio information.

Of course, if the multimedia data stream is the corresponding video frame of screen sharing, the content in the shared screen may be acquired, for example, the image-text recognition may be performed on the video frame to obtain the second display text in the display text. For example, if the video frame includes at least one uniform resource locator (URL) address, the first display content in the second display text is generated based on the at least one URL address. If the video frame includes a character, the second display content in the second display text is determined based on the character.

That is, after the multimedia data stream is acquired, the audio frame of the media data stream may be processed based on the speech-to-text module to obtain the literal expression corresponding to the audio information. To conveniently acquire information such as the screen content, document and link shared by the speaking user in the multimedia data stream, the image-text recognition may be performed on each video frame in the recording screen video to acquire the character and the link in the video frame. The display content in the second display text in the display text is based on the character, the link, the identity of the speaking user and a timestamp corresponding to the content.

In the process of a practical application, there is a case that users filter the target content according to keywords, therefore, in the process of generating the display text based on audio-video information, the method further includes determining a third display text in the display text based on the audio-video frame to determine a content corresponding to a target content from the first display text in response to detecting that the target content in the third display text is triggered, and displaying the content differentially. The third display text includes at least one keyword and/or at least one key sentence.

That is, in the process of converting the audio-video frame into the corresponding characters, a keyword and/or a key sentence may be extracted from the converted character content, and the keyword and/or the key sentence may be used as the third display text in the display text. In this embodiment, extracting the keyword and/or the key sentence may be that at least one vocabulary is obtained by performing the tokenization processing on the content in the display text and a word vector corresponding to each of the at least one vocabulary may be determined.

According to the word vector corresponding to each of the at least one vocabulary, an average word vector is determined, a similarity value between the word vector of each vocabulary and the average word vector is calculated, and a vocabulary whose similarity value is higher than a preset value is used as the keyword. The key sentence in the text may be extracted in the same manner. A relationship between the first display text and each keyword and/or each key sentence in the third display text is established. When the key word or the key sentence is triggered, a position of the keyword or the key sentence in the first display text may be quickly determined from the first display text. Since the position correspondence is established between the display text and the multimedia data stream, when a sentence to which the keyword belongs in the first display text is triggered, the recording screen video may play the multimedia data stream corresponding to the timestamp, based on a timestamp of the sentence to which the keyword belongs.

In the process of the practical application, to achieve a reasonable layout, the quick determination of the display content corresponding to each region in the target page may be the determination of a region proportion of each display text on a display page, based on the display content in each display text.

For example, the region proportion of each display text on the display page may be dynamically determined according to the display content amount of each display text. For example, the more the display content of a region is, the larger the region on the target page is.

The first display text, the second display text, the third display text in the display text and the multimedia data stream are respectively displayed in preset display regions on the target page. A preset display region of the first display text is larger than a preset display region of the recording screen video, the preset display region of the recording screen video is larger than a preset display region of the second display text, and the display region of the second display text is larger than a display region of the third display text.

That is, the first display region is mainly used for displaying text data corresponding to the multimedia data stream, so that there is more content, and more regions may be acquired from the target page to display the first display text. An area of a second display region is smaller than an area of the first display region and is used for displaying the multimedia data stream such as the recording screen video; a display area of the third display region is smaller than the display area of the second display region and is used for displaying the content corresponding to the video frame in the multimedia data stream; and a fourth display region is a region for displaying the third display text and is used for displaying the keyword and/or the key sentence extracted from the multimedia data stream. Since the multimedia data stream generally corresponds to a relatively large number of characters, the large number of characters may be displayed in a relatively large font on the target page in order to be easy for users to read; and the content of key sentences or keywords is less, the display region for the content on the display page may be as small as possible.

Figure 3:
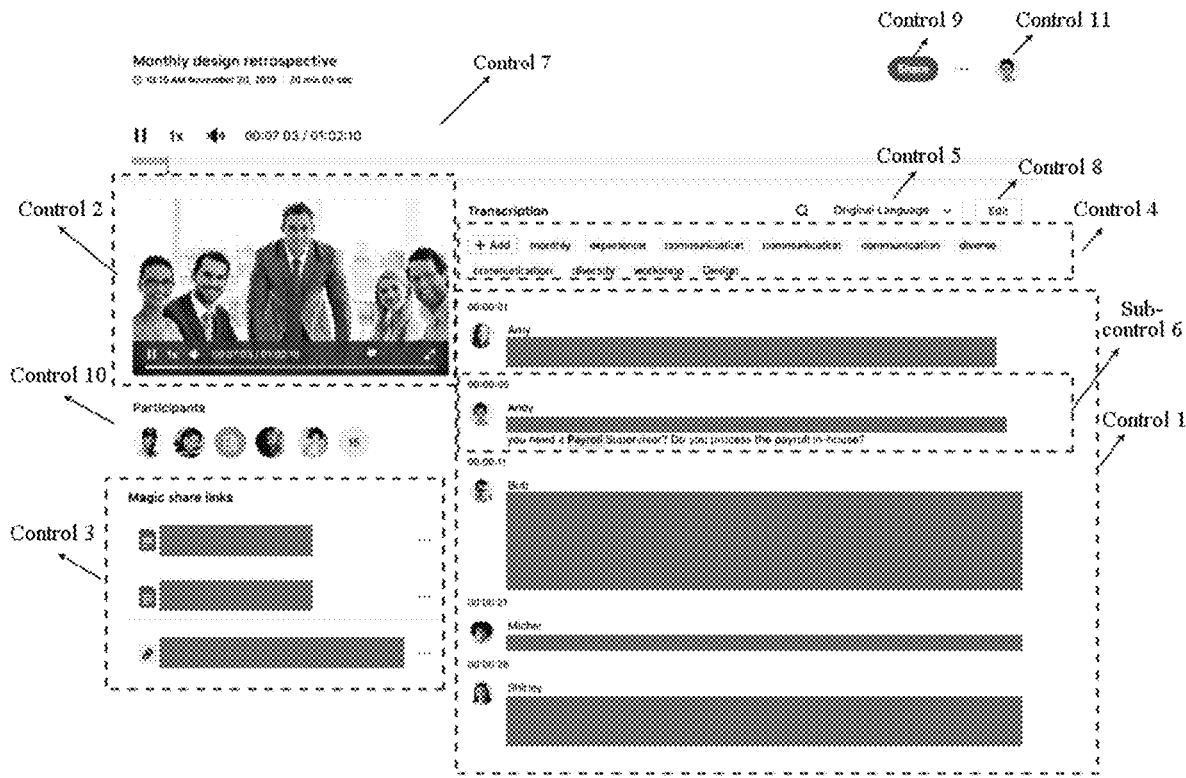
FIG. 3 is a schematic diagram of a target page according to an embodiment of the present disclosure.

To clearly understand the content displayed on the target page, as shown in FIG. 3, the target page may include a control 1, a control 2, a control 3 and a control 4. The control 1 is a control for displaying the first display text, and the speaking content corresponding to each speaking user may be displayed in a text region of the control 1. The control 2 is a control for displaying the recording screen video, and the recording screen video may be placed in the control 2. The control 3 is a control for displaying the second display text, and information such as a shared document and a shared link may be displayed in the control 3. The control 4 is a control for displaying the third display text, and the keywords or key sentences corresponding to the recording screen video and the first display text may be displayed in the control 4.

Figure 4:
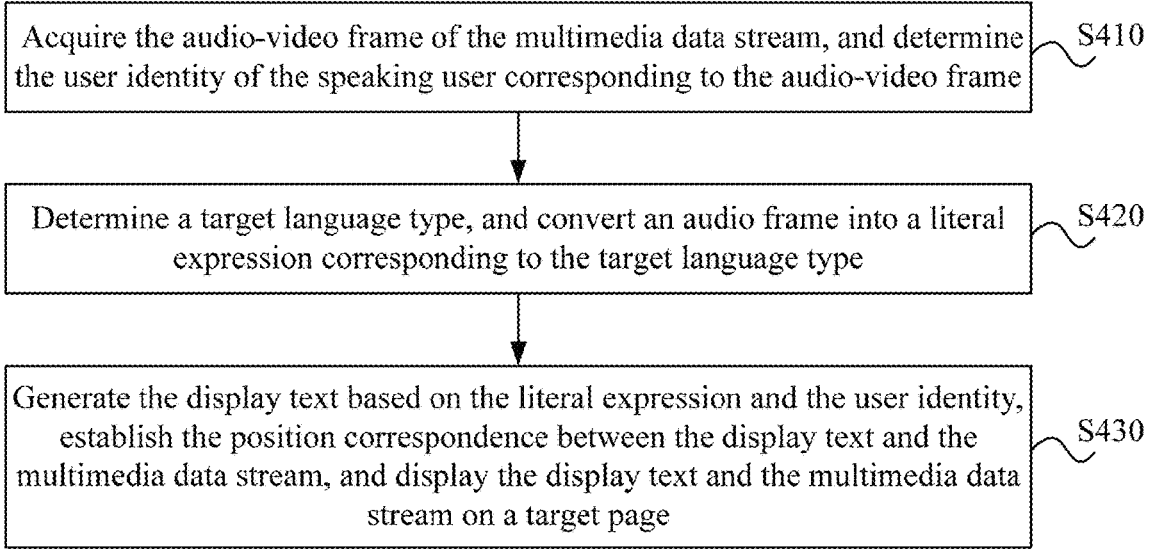
FIG. 4 is a flowchart of an interactive information processing method according to another embodiment of the present disclosure.

FIG. 4 is a flowchart of an interactive information processing method according to another embodiment of the present disclosure. On the basis of the foregoing embodiments, there is a case that a language type used by each speaking user speaking in the multimedia data stream is not matched with a current user. Exemplarily, the language type used by each speaking user in the recording screen video includes English and Chinese. If the language type used by the current user is Japanese, the content in the display text and the recording screen video cannot be read or understood. To reduce this kind of situation, a target language type corresponding to a target user (the current user) may be determined in advance. Terminological explanations identical to or corresponding to the above embodiments will not be repeated here.

As shown in FIG. 4, the method includes steps described below.

In S410, a user identity of a speaking user corresponding to the audio-video frame is determined based on the audio-video frame of the multimedia data stream.

In S420, a target language type is determined, and the audio-video frame is converted into a literal expression corresponding to the target language type.

The audio-video frame in the multimedia data stream may be converted into a corresponding language type, and the converted language type is used as the target language type. For example, if it is required to convert an audio frame of the recording screen video frame into the language type of Japanese, the target language type may be Japanese.

In this embodiment, determining the target language type may be as follows: acquiring a historical language type used by the current client, and determining the target language type based on the historical language type.

For example, the historical language type selected by the current client, such as a language type used by the current client before this time, is acquired. The target language type is determined based on the historical language type.

In this embodiment, determining the target language type based on the historical language type includes at least one of a use frequency of each historical language type, a language type used in the case of converting a previous audio frame into characters, a language type set by the current client, or a login address of the current client, that is, determining the target language type based on the login address.

For example, the use frequency of each historical language type by the current client is acquired, and a language type with the highest frequency may be used as the target language type. For example, the historical language types used by the current client include Chinese with times, English with 2 times and Japanese with 3 times, and Chinese may be used as the target language type based on the use frequency of each historical language type. Alternatively, the language type used in the case of converting the previous audio frame into the characters may be acquired, and the language type previously used is used as the target language type. Alternatively, it may be determined whether a default language type is set in the current client, if the default language type is set in the current client, the default language type is used as the target language type. Alternatively, the login address of the current client is acquired, a region to which the login address belongs is determined, such as China, then Chinese may be used as the target language type; and if the region to which the login address belongs is the United Kingdom, English may be used as the target language type.

It should be noted that if the user does not trigger a language type selection control, an original language type of each speaking user may be acquired. The audio information is directly translated into translation data in the original language type, and the user identity and the translation data are used as the display content in the display text. The original language type of the speaking user here may be, for example, the language type used by the speaking user when speaking.

On the basis of the technical schemes, to facilitate a user to adjust the language type corresponding to the user in time, the display interface further includes a language type setting control. For example, referring to FIG. 3, in response to detecting that a language type selection control 5 is triggered, a language selection list may be popped up and includes at least one language type, and from which the user may select a language type with a relatively high matching degree as the target language type. After the target language type is selected, the display text on the target page may correspond to the target language type.

In S430, the display text is generated based on the literal expression and the user identity, the position correspondence between the display text and the multimedia data stream is established, and the display text and the multimedia data stream are displayed on the target page.

For example, the display text corresponding to the recording screen video is generated based on the literal expression, the user identity and the character expression corresponding to each audio-video frame.

According to the technical schemes of the embodiments of the disclosure, the display text corresponding to the recording screen video can be displayed as the character expression corresponding to the target language type by acquiring a preset target language type, which not only improves the convenience for users to read the display text, but also can locate a corresponding position in the recording screen video based on the display text. Further, in a process of reading the display text, the target language type may also be updated based on the language type selection control on the page, further improving the matching degree with the users and the user experience.

On the basis of the technical schemes, the method further includes acquiring a search content edited in a search content editing control, and acquiring a target content corresponding to the search content from the display text, each target content is the same as the search content; and displaying the target content differentially in the display text, and marking an audio-video frame corresponding to the target content in a controlling control corresponding to the multimedia data stream. The controlling control is displayed associated with the playback timeline of the multimedia data stream. A position of the audio-video frame corresponding to the target content is marked in the controlling control based on a timestamp of the target content.

The search content editing control may be a control displayed on the target page and configured for editing the search content. The target page may include display texts generated based on speech information of different language types. A server may acquire the search content edited in the search content editing control and use the acquired search content as the target content. For example, the search content edited in the search content editing control is "algorithm", and the target content acquired by the server is algorithm. Differentially displaying may be displaying the target content in bold to distinguish the target content from other content. Marking in the controlling control may be marking the audio-video frame corresponding to the target content. For example, after the audio-video frame corresponding to the target content is determined, a position of the audio-video frame in the controlling control may be determined, and a dot or a triangle is marked below the position, referring to FIG. 5. The audio-video frame corresponding to the target content in the multimedia data stream is determined based on a pre-established association, and the audio-video frame corresponding to the target content is marked on the controlling control. In this manner, the user can clearly know the position of the target content in the display text and the position of the target content in the multimedia data stream.

Figure 5:
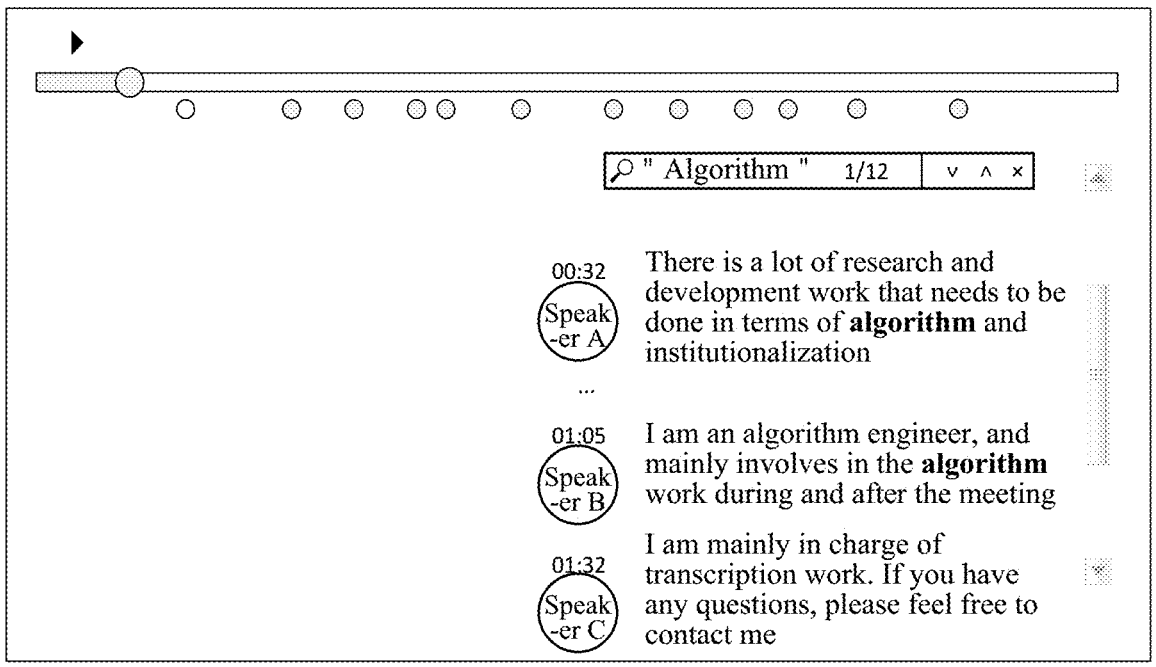
FIG. 5 is a structural diagram of displaying a target content displayed in correspondence with a mark on a timeline according to an embodiment of the present application.

It should be noted that in the search content editing control, the number of target content may be displayed, for example, the total number of target content displayed in the search content editing control is 12, referring to FIG. 5.

It should also be noted that the number of target content may be more than one, and correspondingly, the number of marks on the timeline may be more than one. Referring to FIG. 3, the number of target content is 12, and the number of marks on the timeline is also 12. Of course, to facilitate the user to determine which piece of content in all target content is currently triggered, the search content editing control also displays the order corresponding to the currently triggered target content.

In this embodiment, marking the audio-video frame corresponding to the target content in the controlling control corresponding to the multimedia data stream includes: determining a playback timestamp corresponding to the target content, and marking a video playback moment corresponding to the target content in the controlling control corresponding to the multimedia data stream according to the playback timestamp.

For example, the playback timestamp corresponding to the target content may be determined, a corresponding multimedia data stream may be determined according to the playback timestamp, and a position corresponding to the playback timestamp is marked in the controlling control.

In this embodiment, the method further includes, in response to detecting a triggering operation triggering the target content, determining a target playback timestamp of the target content; and displaying a marker corresponding to the target playback timestamp differentially.

For example, the user may trigger the target content, when the target content is triggered, the target playback timestamp corresponding to the target content is determined, and the marker corresponding to the target playback timestamp is displayed differentially from other markers. Differentially displaying may be color-differential displaying, highlight displaying, etc.

Figure 6:
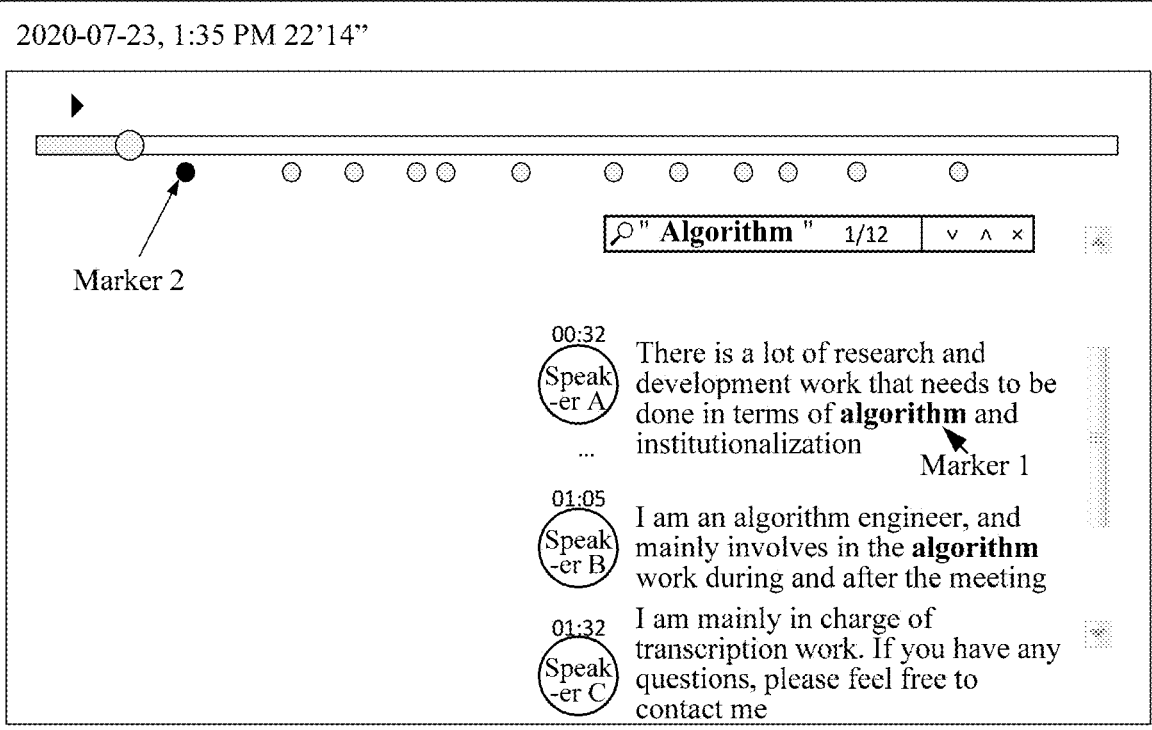
FIG. 6 is a schematic diagram of highlighting a mark on a timeline after the target content is triggered according to an embodiment of the present application.

Exemplarily, referring to FIG. 6, when the user triggers the target content corresponding to a marker 1, a target playback timestamp corresponding to the target content of the marker 1 may be determined. According to the target playback timestamp, it may be determined that a marker corresponding to the target playback timestamp on the timeline is the marker 2, and this marker may be highlighted.

Figure 7:
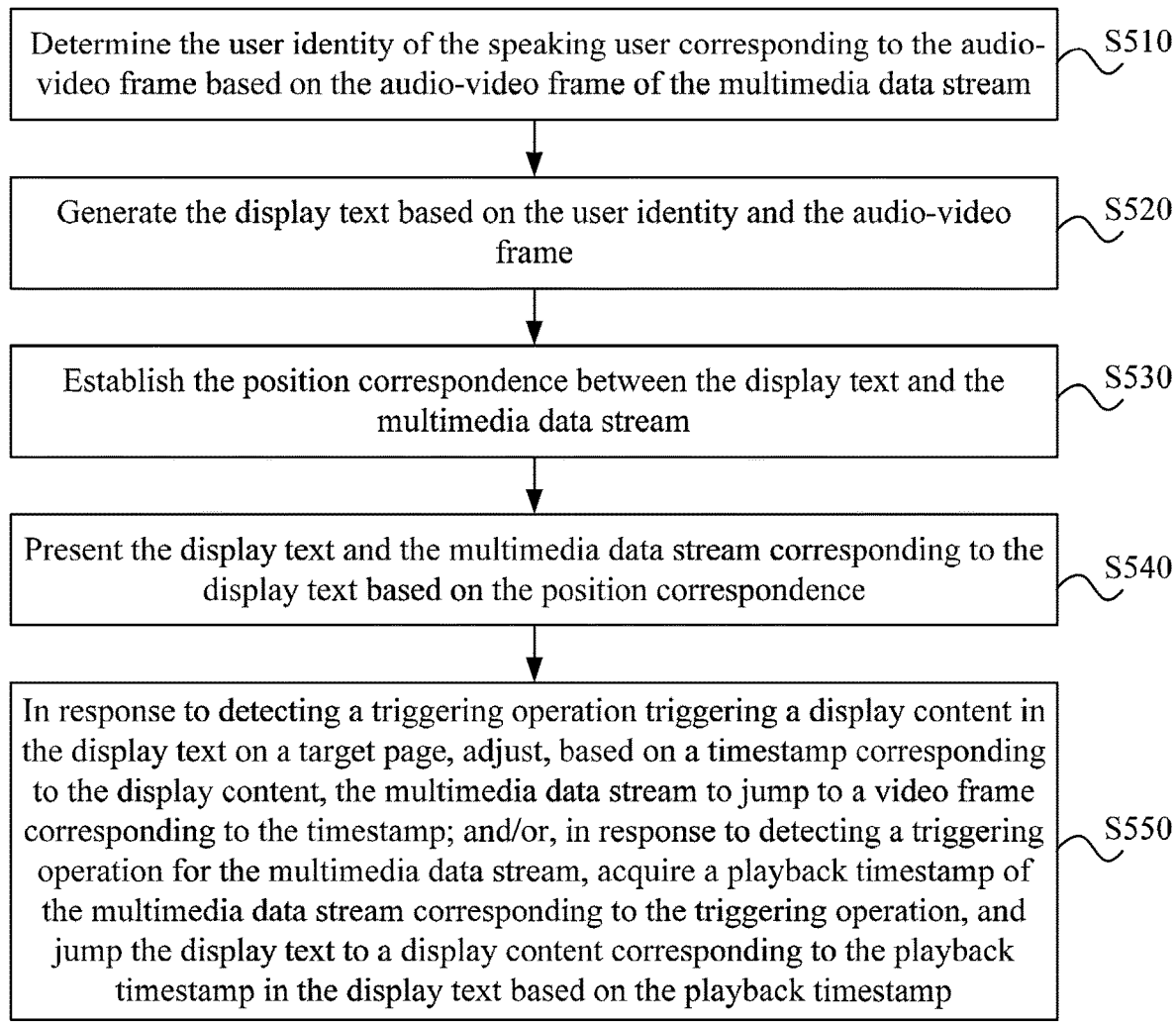
FIG. 7 is a flowchart of an interactive information processing method according to another embodiment of the present disclosure.

FIG. 7 is a flowchart of an interactive information processing method according to another embodiment of the present disclosure. On the basis of the foregoing embodiments, after the content displayed on the client display interface is determined, when a control on the target page is triggered, a corresponding operation may be performed.

Technical terms identical to or corresponding to the preceding embodiments are not repeated here.

As shown in FIG. 7, the method includes steps described below.

In S510, the user identity of the speaking user corresponding to the audio-video frame is determined based on the audio-video frame of the multimedia data stream.

In S520, the display text is generated based on the user identity and the audio-video frame.

In S530, the position correspondence is established between the display text and the multimedia data stream.

In S540, the display text and the multimedia data stream corresponding to the display text are presented based on the position correspondence.

In S550, in response to detecting a triggering operation triggering a display content in the display text on a target page, the multimedia data stream is adjusted to jump to a video frame corresponding to a timestamp based on the timestamp corresponding to the display content; and/or, in response to detecting a triggering operation for the multimedia data stream, a playback timestamp of the multimedia data stream corresponding to the triggering operation is acquired, and the display text is jumped to the display content corresponding to the playback timestamp in the display text based on the playback timestamp.

It should be noted that since there is a certain position linkage relationship between the multimedia data stream and the display text displayed on the target page, a synchronous display between the multimedia data stream and the display text on the target page can be achieved.

Exemplarily, referring to FIG. 4, in response to detecting a triggering operation on the display content corresponding to a speaking user Andy in the first display text on the target page, based on the timestamp of 00:00:05 corresponding to the display content, a progress bar of the multimedia data stream may jump to a playback moment corresponding to the timestamp of 00:00:05. That is, when a user triggers a sub-control 6 in the control 1, the progress bar of the multimedia data stream may jump to the playback time of the timestamp corresponding to the sub-control 6. Correspondingly, in response to detecting a triggering operation triggering the progress bar on the multimedia data stream, the playback moment of the multimedia data stream may be determined, and based on a current playback moment of the multimedia data stream, the display text may be jumped to the literal expression corresponding to the current playback moment in the display text to achieve a linkage between the characters and the multimedia data stream.

On the basis of the preceding schemes, it should be noted that the display content corresponding to the multimedia data stream is displayed differentially in the display text based on the position correspondence.

For example, the multimedia data stream may be a recording screen video. In the process of playing the recording screen video, the text content corresponding to a current video frame is displayed differentially in the display text, so that the user can know the specific position of the current video frame in the display text, thus facilitating the user to read.

In this embodiment, differentially displaying may be presenting the text content corresponding to the current video frame in a manner different from other content in the text. Presenting the text content corresponding to the current video frame may be, but not limited to, the presentation region and/or the presentation style. The presentation region may be a presentation region in the target page that may attract the attention of the user. The presentation style may be any at least one of highlight displaying, bold displaying of the text content corresponding to the current video frame, and displaying a font color differentially from the font color of other content.

To achieve the precise adjustment of the multimedia data stream, the target page may also include a controlling control. Referring to FIG. 3, a controlling control 7 may also be configured to adjust a current playback moment of the multimedia data stream. To achieve the precise adjustment, the length of a progress bar corresponding to the controlling control 7 is larger than the length of a progress bar in the multimedia data stream. Since a playback duration corresponding to the multimedia data stream is fixed, the longer the length of the progress bar is, the smaller the corresponding change amount is, that is, the higher the corresponding adjustment precision is. Therefore, the length of the progress bar corresponding to the controlling control 7 is larger than an entry bar corresponding to the multimedia data stream, thus the adjustment precision corresponding to the controlling control 7 is higher than the adjustment precision of an adjustment control for the progress of the multimedia data stream in the multimedia data stream.

For example, in response to detecting a triggering operation triggering the controlling control on the target page, a playback timestamp corresponding to the controlling control is acquired, the multimedia data stream is adjusted to jump to a playback position corresponding to the playback timestamp based on the playback timestamp, and the content of a display text of a video frame corresponding to the playback timestamp is displayed differentially in the display text.

For example, in response to detecting the triggering operation triggering the controlling control on the target page, the playback moment corresponding to the progress bar in the controlling control may be acquired, that is, a position to which the progress bar in the controlling control moves may be dragged, and the position may correspond to the playback timestamp of the multimedia data stream. Based on the playback timestamp, the multimedia data stream is jumped to the audio-video frame corresponding to the playback timestamp, and the display content corresponding to the video frame in the display text is determined at the same time.

It should be noted that in the playback process of the multimedia data stream, to facilitate the user to determine the text content corresponding to the current video frame, that is, the text content corresponding to the current video frame is quickly determined from the display text. For example, in the playback process of the multimedia data stream, based on a playback timestamp corresponding to the current audio-video frame, the display content corresponding to the playback timestamp in the display text is determined, and the display content is displayed differentially, such as highlight displaying. In this way, the display content corresponding to the current video frame may be quickly located from the display text, thus improving the convenience and efficiency of the user reading.

For example, in response to detecting a triggering operation triggering an editing control on the target page, a permission editing list is displayed, and a user permission of each interactive user is determined based on the permission editing list. The user permission includes a read permission and an editing permission, the read permission is to read text information and video information, and the editing permission is to edit information in a text.

It should be noted that the target page further includes an editing control. If a user triggers a permission editing control, a drop-down menu corresponding to the editing permission may be displayed, and the user may edit the user permission of each speaking user in the drop-down menu. The user permission may include the read permission and the editing permission. The read permission is to only browse or read a video or a display text on the target page, but cannot edit the content on the target page. A user with the editing permission can not only edit the content of the display text on the target page, but also share the content with other users. In this way, corresponding permissions can be set for different users, thus effectively avoiding the outflow of internal resources.

Exemplarily, referring to FIG. 3, in response to detecting a trigger operation triggering the editing control 8 on the target page, the permission editing list may be popped up, and a permission of each interactive user may be edited based on the permission editing list.

It should be noted that in the process of the practical application, if the multimedia data stream and the corresponding display text need to be shared to other users, it may be achieved through a sharing control on the target page. For example, in response to detecting a triggering operation triggering the sharing control on the target page, a target link corresponding to the current target page is generated, and the target link is sent to a user to share with, to cause the user to share with to view the multimedia data stream and the display text based on the target link.

The sharing control may share the multimedia data stream and the display text included in the target page to other users.

For example, in response to detecting a triggering operation triggering the sharing control on the target page, a link based on the content on the target page may be generated and sent to other users. When the link is received by other users, the target page including the multimedia data stream and the display text may be acquired based on the link.

Exemplarily, referring to FIG. 3, in response to detecting a triggering operation triggering a sharing control 9 on the target page, a target link corresponding to the target page may be generated, and the target link is sent to other users to cause the other users to view the multimedia data stream and the display text based on the target link.

On the basis of the technical schemes, it should be noted that in order to make other users to be clear about each interactive user and the total number of users in the multimedia data stream, a head portrait of each interactive user and an identity of the total number of users may be displayed, for example, at a position corresponding to a control 10, and the host of the multimedia data stream may also be displayed, for example, at a position corresponding to a control 11.

Figure 8:
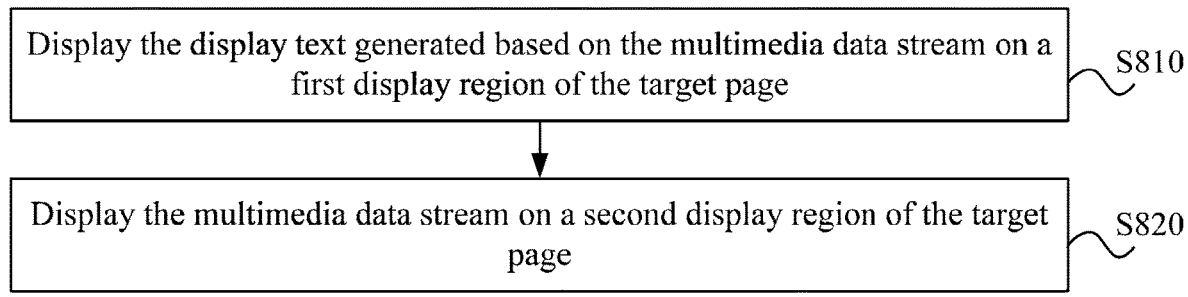
FIG. 8 is a flowchart of an interactive information display method according to an embodiment of the present disclosure.

FIG. 8 is a flowchart of an interactive information display method according to an embodiment of the present disclosure. As shown in FIG. 8, the method includes the steps below.

In S810, a display text generated based on a multimedia data stream is displayed on a first display region of a target page.

In S820, the multimedia data stream is displayed on a second display region of the target page.

A position correspondence is provided between the display text and the multimedia data stream.

On the basis of the preceding technical schemes, the method further includes: displaying, on a third display region of the target page, the content corresponding to a video frame of the multimedia data stream, and displaying, on a fourth display region of the target page, at least one of a keyword or a key sentence in an audio-video frame of the multimedia data stream. The audio-video frame includes the video frame.

On the basis of the preceding technical schemes, the method further includes, in a playback process of the multimedia data stream, displaying the display content in a display text corresponding to the current playback progress sequentially and differentially based on the position correspondence between the display text and the multimedia data stream. The differentially displaying may be color-differentially displaying, highlight displaying and so on.

On the basis of the preceding technical schemes, the method further includes, in response to a triggering operation for a playback progress of the multimedia data stream, performing a jumping display on the display content of the display text based on the position correspondence, or in response to a triggering operation for the display content of the display text, performing a jumping display on the playback progress of the multimedia data stream based on the position correspondence.

Figure 9:
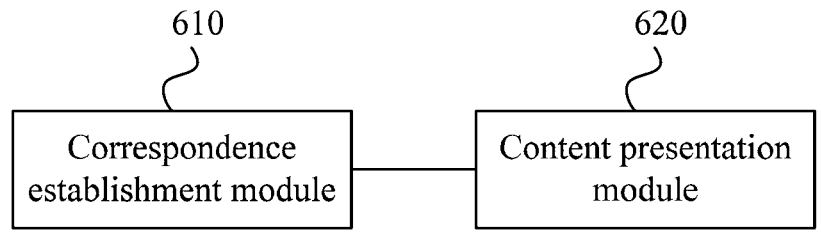
FIG. 9 is a structural diagram of an interactive information processing apparatus according to an embodiment of the present disclosure.

FIG. 9 is a structural diagram of an interactive information processing apparatus according to an embodiment of the present disclosure. As shown in FIG. 9, the apparatus includes a correspondence establishment module 610 and a content presentation module.

The correspondence establishment module 610 is configured to establish a position correspondence between a display text generated based on a multimedia data stream and the multimedia data stream, and the content presentation module 620 is configured to present the display text and the multimedia data stream corresponding to the display text based on the position correspondence. On the basis of the preceding technical schemes, the apparatus further includes a user identity acquisition module and a display text determination module. The user identity acquisition module is configured to acquire an audio-video frame of the multimedia data stream, and determine a user identity of a speaking user corresponding to the audio-video frame. The display text determination module is configured to generate a display text corresponding to the multimedia data stream based on the user identity and the audio-video frame.

On the basis of the preceding technical schemes, the method further includes an information determination module. The information determination module is configured to determine the user identity of the speaking user by performing the voiceprint recognition on the audio frame; and/or determine a client identity of a client to which the audio frame belongs, and determine the user identity of the speaking user based on the client identity.

On the basis of the preceding technical schemes, the apparatus further includes a first text display module.

The first text display module is configured to obtain a literal expression corresponding to the audio frame by performing the speech-to-text processing on the audio frame, and generate a first display text in the display text based on the literal expression and the user identity.

On the basis of the preceding technical schemes, the apparatus further includes a second text display module. The second text display module is configured to obtain characters in the video frame by performing the image-text recognition on the video frame, and generate a second display text in the display text based on the characters and the user identity.

On the basis of the preceding technical schemes, the first display text determination module is further configured to determine the literal expression corresponding to the audio frame, a timestamp currently corresponding to the audio frame and a user identity of a speaking user to which the audio frame belongs, and generate the display content in the display text based on the user identity, the timestamp and the literal expression.

On the basis of the preceding technical schemes, each piece of display content includes at least one paragraph, and the first text display module is configured to, in response to detecting that an interval duration between adjacent audio frames is greater than or equal to a preset interval duration threshold and a user identity of a latter audio frame of the adjacent audio frames is not changed, generate the next paragraph in the display content based on the latter audio frame in a process of performing the speech-to-text processing based on the audio frame.

On the basis of the preceding technical schemes, the apparatus further includes a second text display module. The second text display module is configured to, in response to determining that the video frame includes at least one URL address, generate a first display content in the second display text based on the at least one URL address.

On the basis of the preceding technical schemes, the apparatus further includes a second text display module. The second text display module is further configured to, in response to determining that the video frame includes a character, determine a second display content in the second display text based on the character.

On the basis of the preceding technical schemes, the display text determination module is configured to determine a third display text in the display text based on the audio-video frame to determine a content corresponding to a target content from the first display text in response to detecting that the target content in the third display text is triggered, and display the content differentially. The third display text includes at least one keyword and/or at least one key sentence.

On the basis of the preceding technical schemes, displaying the display text and a recording screen video on the target page includes displaying the third display text, the second display text, the first display text in the display text and the recording screen video in preset display regions on the target page, respectively.

On the basis of the preceding technical schemes, the apparatus includes a region proportion determination module, which is configured to determine a region proportion of the first display text, a region proportion of the second display text and a region proportion of the third display text on a display page based on the display content in the first display text, the display content in the second display text and the display content in the third display text.

On the basis of the preceding technical schemes, the apparatus includes the display text determination module, which is configured to obtain an original language type corresponding to audio information, and generate the display text corresponding to the multimedia data stream based on the user identity, the audio-video frame and the original language type corresponding to the audio-video frame.

On the basis of the preceding technical schemes, the display text determination module is configured to determine a target language type, and convert the audio-video frame from an original language type corresponding to the audio-video frame into a literal expression corresponding to the target language type; and generate the display text based on the literal expression and the user identity.

On the basis of the preceding technical schemes, the target language type determination module is configured to acquire a historical language type used by a current client, and determine the target language type based on the historical language type.

On the basis of the preceding technical schemes, determining the target language type based on the historical language type includes at least one of: determining the target language type from the at least one historical language type based on a use frequency of each of at least one historical language type; using a language type set by the current client as the target language type; or determining the target language type based on a login address of the current client.

On the basis of the preceding technical schemes, the position correspondence includes a timestamp synchronization association. The module is further configured to establish the timestamp synchronization association between the display text and the multimedia data stream based on a timestamp in the display text and a timestamp of the multimedia data stream.

On the basis of the preceding technical schemes, presenting the display text and the multimedia data stream corresponding to the display text based on the position correspondence includes displaying the display content corresponding to the multimedia data stream differentially in the display text based on the position correspondence.

On the basis of the preceding technical schemes, the multimedia data stream and the display text are displayed on a target page, and the target page further includes a controlling control. The apparatus further includes a control module, which is configured to adjust the currently displayed content of the display text and the recording screen video simultaneously based on the controlling control. The adjustment precision corresponding to the controlling control is greater than the adjustment precision of an adjustment control for adjusting the progress of the recording screen video in the recording screen video.

On the basis of the preceding technical schemes, the apparatus further includes a control module, which is configured to, in response to detecting a triggering operation triggering the controlling control on the target page, acquire a playback timestamp corresponding to the controlling control, adjust the multimedia data stream to jump to a playback position corresponding to the playback timestamp based on the playback timestamp, and display the content of a display text of a video frame corresponding to the playback timestamp differentially in the display text.

On the basis of the preceding technical schemes, the apparatus further includes a jump module, which is configured to: in response to detecting a triggering operation triggering a display content in the display text on a target page, adjust, based on a timestamp corresponding to the display content, the recording screen video to jump to a video frame corresponding to the timestamp; and/or, in response to detecting a triggering operation for the recording screen video, acquire a playback timestamp of the recording screen video corresponding to the triggering operation, and jump the display text to a display content corresponding to the playback timestamp in the display text based on the playback timestamp.

On the basis of the preceding technical schemes, the apparatus further includes a permission editing module, which is configured to, in response to detecting a triggering operation for an editing control on a target page, display a permission editing list, and determine a user permission of each interactive user based on the permission editing list, where the user permission is used for representing an access permission of a user to the content presented on the target page.

On the basis of the preceding technical schemes, the apparatus further includes a target page sharing module, which is configured to: in response to detecting a triggering operation triggering a sharing control on a target page, generate a target identity corresponding to the target page, and send the target identity to a user to share with, to cause the user to share with to acquire the target page based on the target identity.

On the basis of the preceding technical schemes, the apparatus further includes a search module, which is configured to acquire a search content edited in a search content editing control, and acquire at least one target content corresponding to the search content from the display text; and display the at least one target content differentially in the display text, and mark an audio-video frame corresponding to the at least one target content in a controlling control corresponding to the multimedia data stream. Each of the at least one target content is the same as the search content.

On the basis of the preceding technical schemes, the search module is further configured to determine a playback timestamp corresponding to each of the at least one target content, and mark an audio-video frame corresponding to the each of the at least one target content in the controlling control corresponding to the multimedia data stream according to the playback timestamp.

On the basis of the preceding technical schemes, the apparatus further includes a differential display module, which is configured to, in response to detecting a triggering operation triggering each of the at least one target content, determine a target playback timestamp of the each of the at least one target content; and display a marker corresponding to the target playback timestamp differentially in the controlling control.

According to the technical schemes of the embodiments of the present disclosure, a position linkage between the recording screen video and the display text is achieved by establishing the position correspondence between the recording screen video and the display text, thereby improving the high efficiency and convenience for users to read the text and watch the recording screen video.

The interactive information processing apparatus according to the embodiments of the present disclosure can execute the interactive information processing method according to any embodiment of the present disclosure, and has functional modules and beneficial effects corresponding to the execution methods.

It is to be noted that units and modules included in the preceding apparatus are just divided according to functional logic, and the division is not limited to this, as long as the corresponding functions can be implemented. Additionally, the specific names of the functional units are just intended for distinguishing, and are not to limit the protection scope of embodiments of the present disclosure.

Figure 10:
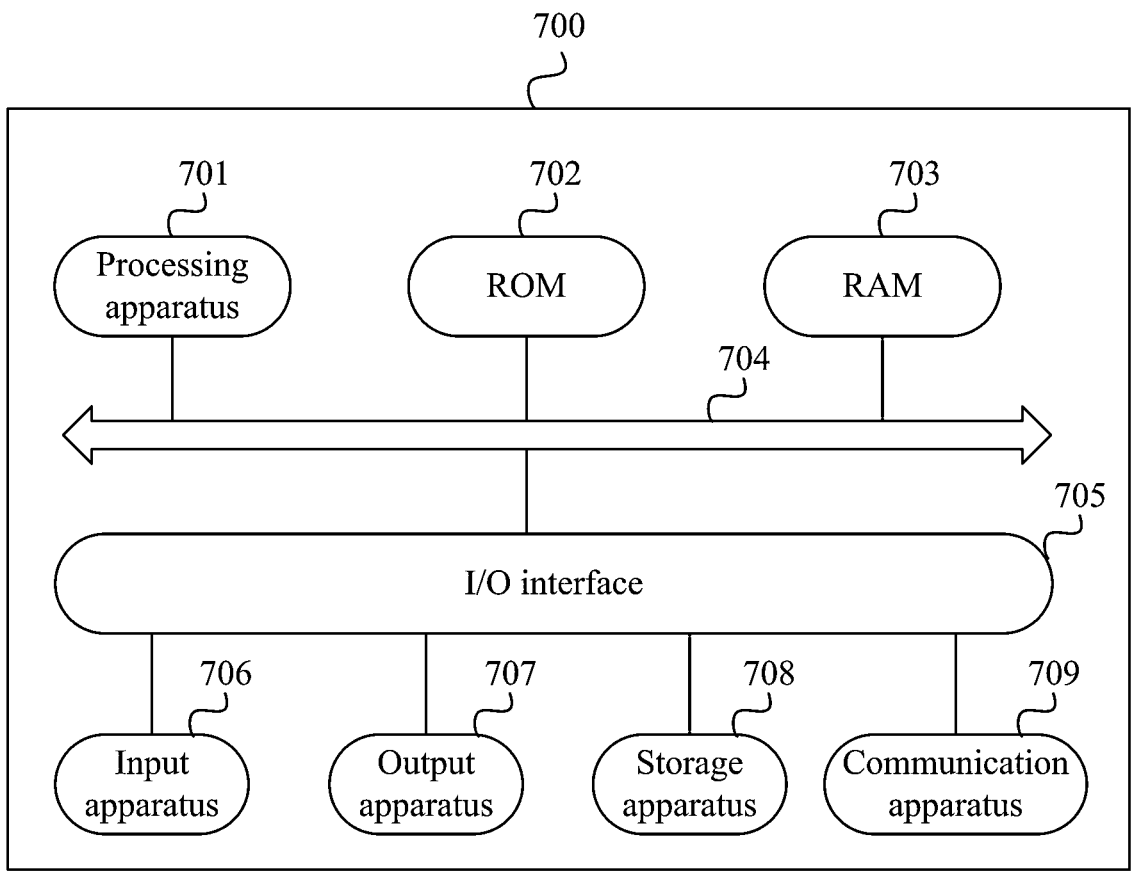
FIG. 10 is a structural diagram of an electronic device according to an embodiment of the present disclosure.

FIG. 10 shows a structure diagram of an electronic device 700 (such as the terminal device or server in FIG. 10) applicable to implementing an embodiment of the present disclosure. A terminal device in the embodiments of the present disclosure may include, but is not limited to, mobile terminals such as a mobile phone, a laptop, a digital broadcast receiver, a personal digital assistant (PDA), a PAD, a portable media player (PMP), and an in-vehicle terminal (such as an in-vehicle navigation terminal) and stationary terminals such as a digital television (TV) and a desktop computer. The electronic device shown in FIG. 10 is merely an example and is not intended to limit the function and usage scope of embodiments of the present disclosure.

As shown in FIG. 10, the electronic device 700 may include the processing apparatus 701 (such as a central processing unit and a graphics processing unit). The processing apparatus 702 may perform various types of appropriate operations and processing based on a program stored in the read-only memory (ROM) 706 or a program loaded from the storage apparatus 703 to the random-access memory (RAM) 603. Various programs and data required for the operation of the electronic device 700 are also stored in the RAM 703. The processing apparatus 701, the ROM 702, and the RAM 703 are connected through a bus 704. An input/output (I/O) interface 705 is also connected to the bus 704.

Generally, the following apparatus may be connected to the I/O interface 705: an input apparatus 706 such as a touch screen, a touch pad, a keyboard, a mouse, a camera, a microphone, an accelerometer, and a gyroscope; an output apparatus 707 such as a liquid crystal display (LCD), a speaker, and a vibrator; the storage apparatus 706 such as a magnetic tape and a hard disk, and a communication apparatus 709. The communication apparatus 709 may allow the electronic device 700 to perform wireless or wired communication with other devices to exchange data. Although FIG. 10 shows the electronic device 700 having various apparatuses, it is to be understood that all of the apparatuses shown herein need not be implemented or present. Alternatively, more or fewer apparatuses may be implemented or present.

Particularly, according to the embodiment of the present disclosure, the process described preceding with reference to the flowchart may be implemented as a computer software program. For example, the embodiment of the present disclosure includes a computer program product. The computer program product includes a computer program carried in a non-transitory computer-readable medium. The computer program includes program codes for performing the method shown in the flowchart. In such an embodiment, the computer program may be downloaded from a network and installed through the communication apparatus 709, or may be installed from the storage apparatus 706, or may be installed from the ROM 702. When the computer program is executed by the processing apparatus 701, the preceding functions defined in the methods of the embodiments of the present disclosure are performed.

The electronic device provided in this embodiment belongs to the same inventive concept as the interactive information processing method provided in the preceding-mentioned embodiment, and for the technical details not described in detail in this embodiment, reference can be made to the preceding-mentioned embodiment, and this embodiment has the same beneficial effects as the preceding embodiments.

This embodiment provides a computer storage medium. A computer program is stored on the computer storage medium. When the program is executed by a processor, the interactive information processing method provided in the preceding-mentioned embodiment is implemented.

It is to be noted that the preceding computer-readable medium in the present disclosure may be a computer-readable signal medium or a computer-readable storage medium or any combination thereof. The computer-readable storage medium may be, but is not limited to, an electrical, magnetic, optical, electromagnetic, infrared or semiconductor system, apparatus or device, or any combination thereof. More specific examples of the computer-readable storage medium may include, but are not limited to, an electrical connection with one or more wires, a portable computer magnetic disk, a hard disk, a random-access memory (RAM), a read-only memory (ROM), an erasable programmable read-only memory (EPROM), a flash memory, an optical fiber, a portable compact disk read-only memory (CD-ROM), an optical memory device, a magnetic memory device, or any appropriate combination thereof. In the present disclosure, the computer-readable storage medium may be any tangible medium including or storing a program. The program may be used by or used in conjunction with an instruction execution system, apparatus, or device. In the present disclosure, the computer-readable signal medium may include a data signal propagated on a baseband or as a part of a carrier, and computer-readable program codes are carried in the data signal. The data signal propagated in this manner may be in multiple forms and includes, and is not limited to, an electromagnetic signal, an optical signal, or any suitable combination thereof. The computer-readable signal medium may further be any computer-readable medium other than the computer-readable storage medium. The computer-readable signal medium may send, propagate, or transmit a program used by or in conjunction with an instruction execution system, apparatus, or device. The program codes included on the computer-readable medium may be transmitted via any appropriate medium which includes, but is not limited to, a wire, an optical cable, a radio frequency (RF), or any appropriate combination thereof.

In some embodiments, clients and servers may communicate using any currently known or future developed network protocol, such as the hypertext transfer protocol (HTTP), and may be interconnected with any form or medium of digital data communication (such as a communication network). Examples of the communication network include a local area network (LAN), a wide area network (WAN), an internet (such as the Internet) and a peer-to-peer network (such as an ad hoc network), as well as any currently known or future developed network.

The computer-readable medium may be included in the electronic device or may exist alone without being assembled into the electronic device.

The computer-readable medium carries one or more programs. When the one or more programs are executed by the electronic device, the electronic device is configured to establish a position correspondence between a display text generated based on a multimedia data stream and the multimedia data stream; and present the display text and the multimedia data stream corresponding to the display text based on the position correspondence.

Computer program codes for performing the operations in the present disclosure may be written in one or more programming languages or a combination thereof. The preceding one or more programming languages include, but are not limited to, object-oriented programming languages such as Java, Smalltalk and C++, as well as conventional procedural programming languages such as C or similar programming languages. The program codes may be executed entirely on a user computer, partly on the user computer, as a stand-alone software package, partly on the user computer and partly on a remote computer, or entirely on the remote computer or a server. In the case relating to the remote computer, the remote computer may be connected to the user computer via any type of network including a local area network (LAN) or a wide area network (WAN), or may be connected to an external computer (for example, via the Internet through an Internet service provider).

The flowcharts and block diagrams in the drawings show the possible architecture, function and operation of the system, method and computer program product according to various embodiments of the present disclosure. In this regard, each block in a flowchart or block diagram may represent a module, a program segment, or part of codes that contains one or more executable instructions for implementing specified logical functions. It is also to be noted that in some alternative implementations, the functions in the blocks may occur in sequences different from those shown in the drawings. For example, two successive blocks may actually be executed substantially in parallel or in a reverse order, which depends on the functions involved. It is also to be noted that each block in the block diagrams and/or flowcharts and a combination of blocks in the block diagrams and/or flowcharts may be implemented by a specific-purpose hardware-based system which performs specified functions or operations or a combination of specific-purpose hardware and computer instructions.

The units described in the embodiments of the present disclosure may be implemented in software or hardware. The names of the modules/units do not constitute a limitation on the units themselves. For example, a correspondence establishment module may also be described as "a timestamp synchronization association establishment module".

The functions described preceding herein may be performed, at least partially, by one or more hardware logic components. For example, and without limitations, example types of hardware logic components that may be used include: a field-programmable gate array (FPGA), an application-specific integrated circuit (ASIC), an application-specific standard product (ASSP), a system on a chip (SOC), a complex programmable logic device (CPLD) and the like.

In the context of the present disclosure, a machine-readable medium may be a tangible medium that may include or store a program that is used by or in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof. Concrete examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device, or any appropriate combination thereof.

According to one or more embodiments of the present disclosure, [example 1] provides an interactive information processing method. The method includes: establishing a position correspondence between a display text generated based on a multimedia data stream and the multimedia data stream; and presenting the display text and the multimedia data stream corresponding to the display text based on the position correspondence.

According to one or more embodiments of the present disclosure, [example 2] provides an interactive information processing method. The method further includes the following.

For example, an audio-video frame of the multimedia data stream is acquired, and g a user identity of a speaking user corresponding to the audio-video frame is determined; and a display text corresponding to the multimedia data stream is generated based on the user identity and the audio-video frame.

According to one or more embodiments of the present disclosure, [example 3] provides an interactive information processing method. The method further includes the following.

For example, acquiring the audio-video frame of the multimedia data stream, and determining the user identity of the speaking user corresponding to the audio-video frame include at least one of determining the user identity of the speaking user by performing a voiceprint recognition on an audio frame; or determining a client identity of a client to which the audio frame belongs, and determining the user identity of the speaking user based on the client identity.

According to one or more embodiments of the present disclosure, [example 4] provides an interactive information processing method. The method further includes the following.

For example, generating the display text corresponding to the multimedia data stream based on the user identity and the audio-video frame includes: obtaining a literal expression corresponding to the audio frame by performing the speech-to-text processing on the audio frame, and generating a first display text in the display text based on the literal expression and the user identity.

According to one or more embodiments of the present disclosure, [example 5] provides an interactive information processing method. The method further includes the following.

For example, generating the display text corresponding to the multimedia data stream based on the user identity and the audio-video frame includes: obtaining characters in the video frame by performing an image-text recognition on the video frame, and generating a second display text in the display text based on the characters and the user identity.

According to one or more embodiments of the present disclosure, [example 6] provides an interactive information processing method. The method further includes the following.

For example, obtaining the literal expression corresponding to the audio frame by performing the speech-to-text processing on the audio frame, and generating the first display text in the display text based on the literal expression and the user identity include: determining the literal expression corresponding to the audio frame, a timestamp currently corresponding to the audio frame and a user identity of a speaking user to which the audio frame belongs; and generating a piece of display content in the display text based on the user identity, the timestamp and the literal expression.

According to one or more embodiments of the present disclosure, [example 7] provides an interactive information processing method. The method further includes the following.

For example, each piece of display content includes at least one paragraph; and obtaining the literal expression corresponding to the audio frame by performing the speech-to-text processing on the audio frame, and generating the first display text in the display text based on the literal expression and the user identity include: in a process of performing the speech-to-text processing based on the audio frame, in response to detecting that an interval duration between adjacent audio frames is greater than or equal to a preset interval duration threshold and a user identity of a latter audio frame of the adjacent audio frames is not changed, generating a next paragraph in the display content based on the latter audio frame.

According to one or more embodiments of the present disclosure, [example 8] provides an interactive information processing method. The method further includes the following.

For example, obtaining the second display text in the display text by performing the image-text recognition on the video frame includes: in response to determining that the video frame comprises at least one uniform resource locator (URL) address, generating a first display content in the second display text based on the at least one URL address.

According to one or more embodiments of the present disclosure, [example 9] provides an interactive information processing method. The method further includes the following.

For example, obtaining the second display text in the display text by performing the image-text recognition on the video frame includes, in response to determining that the video frame comprises a character, determining a second display content in the second display text based on the character.

According to one or more embodiments of the present disclosure, [example 10] provides an interactive information processing method. The method further includes the following.

For example, generating the display text corresponding to the multimedia data stream based on the user identity and the audio-video frame includes: determining a third display text in the display text based on the audio-video frame to determine a content corresponding to a target content from the first display text in response to detecting that the target content in the third display text is triggered, and display the content differentially; where the third display text includes at least one keyword and/or at least one key sentence.

According to one or more embodiments of the present disclosure, [example 11] provides an interactive information processing method. The method further includes the following.

For example, displaying the display text and the multimedia data stream on the target page includes: displaying the third display text, the second display text, the first display text in the display text and a recording screen video in preset display regions on the target page, respectively.

According to one or more embodiments of the present disclosure, [example 12] provides an interactive information processing method. The method further includes the following.

For example, a region proportion of the first display text, a region proportion of the second display text and a region proportion of the third display text on a display page are determined based on the display content in the first display text, the display content in the second display text and the display content in the third display text.

According to one or more embodiments of the present disclosure, [example 13] provides an interactive information processing method. The method further includes the following.

For example, generating the display text corresponding to the multimedia data stream based on the user identity and the audio-video frame includes: obtaining an original language type corresponding to audio information in the audio-video frame; and generating the display text corresponding to the multimedia data stream based on the user identity, the audio-video frame and the original language type corresponding to the audio-video frame.

According to one or more embodiments of the present disclosure, [example 14] provides an interactive information processing method. The method further includes the following.

For example, generating the display text corresponding to the multimedia data stream based on the user identity and the audio-video frame includes: determining a target language type, and converting the audio-video frame from an original language type corresponding to the audio-video frame to a literal expression corresponding to the target language type; and generating the display text based on the literal expression and the user identity.

According to one or more embodiments of the present disclosure, [example 15] provides an interactive information processing method. The method further includes the following.

For example, determining the target language type includes acquiring a historical language type used by a current client and determining the target language type based on the historical language type.

According to one or more embodiments of the present disclosure, [example 16] provides an interactive information processing method. The method further includes the following.

For example, determining the target language type based on the historical language type includes at least one of determining the target language type from the at least one historical language type based on a use frequency of each of at least one historical language type; using a language type set by the current client as the target language type; or determining the target language type based on a login address of the current client.

According to one or more embodiments of the present disclosure, [example 17] provides an interactive information processing method. The method further includes the following.

For example, the position correspondence comprises a timestamp synchronization association, and establishing the position correspondence between the display text generated based on the multimedia data stream and the multimedia data stream includes establishing the timestamp synchronization association between the display text and the multimedia data stream based on a timestamp in the display text and a timestamp of the multimedia data stream.

According to one or more embodiments of the present disclosure, [example 18] provides an interactive information processing method. The method further includes the following.

For example, presenting the display text and the multimedia data stream corresponding to the display text based on the position correspondence includes displaying the display content corresponding to the multimedia data stream differentially in the display text based on the position correspondence.

According to one or more embodiments of the present disclosure, [example 19] provides an interactive information processing method. The method further includes the following.

For example, the multimedia data stream and the display text are displayed on a target page, the target page further includes a controlling control; and the method further includes adjusting the currently displayed content of the display text and the recording screen video simultaneously based on the controlling control.

An adjustment precision corresponding to the controlling control is greater than an adjustment precision of an adjustment control for adjusting a progress of the recording screen video in the recording screen video.

According to one or more embodiments of the present disclosure, [example 20] provides an interactive information processing method. The method further includes the following.

For example, in response to detecting a triggering operation triggering the controlling control on the target page, a playback timestamp corresponding to the controlling control is acquired, the multimedia data stream is adjusted to jump to a playback position corresponding to the playback timestamp based on the playback timestamp, and the content of a display text of a video frame corresponding to the playback timestamp is differentially displayed in the display text.

According to one or more embodiments of the present disclosure, [example 21] provides an interactive information processing method. The method further includes the following.

For example, in response to detecting a triggering operation triggering a display content in the display text on a target page, based on a timestamp corresponding to the display content, the recording screen video is adjusted to jump to a video frame corresponding to the timestamp; and/or, in response to detecting a triggering operation for the recording screen video, a playback timestamp of the recording screen video corresponding to the triggering operation is acquired, and the display text is jumped to a display content corresponding to the playback timestamp in the display text based on the playback timestamp.

According to one or more embodiments of the present disclosure, [example 22] provides an interactive information processing method. The method further includes the following.

For example, in response to detecting a triggering operation for an editing control on a target page, a permission editing list is displayed, and a user permission of each interactive user is determined based on the permission editing list, where the user permission is used for representing an access permission of a user to the content presented on the target page.

According to one or more embodiments of the present disclosure, [example 23] provides an interactive information processing method. The method further includes the following.

For example, in response to detecting a triggering operation triggering a sharing control on a target page, generating a target identity corresponding to the target page, and sending the target identity to a user to share with, to cause the user to share with to acquire the target page based on the target identity.

According to one or more embodiments of the present disclosure, [example 24] provides an interactive information processing method. The method further includes the following.

For example, acquiring a search content edited in a search content editing control, and acquiring at least one target content corresponding to the search content from the display text; where each of the at least one target content is the same as the search content; and displaying the at least one target content differentially in the display text, and marking an audio-video frame corresponding to the at least one target content in a controlling control corresponding to the multimedia data stream.

According to one or more embodiments of the present disclosure, [example 25] provides an interactive information processing method. The method further includes the following.

For example, marking the audio-video frame corresponding to the at least one target content in the controlling control corresponding to the multimedia data stream includes: determining a playback timestamp corresponding to each of the at least one target content, and marking an audio-video frame corresponding to the each of the at least one target content in the controlling control corresponding to the multimedia data stream according to the playback timestamp.

According to one or more embodiments of the present disclosure, [example 26] provides an interactive information processing method. The method further includes the following.

For example, in response to detecting a triggering operation triggering each of the at least one target content, a target playback timestamp of the each of the at least one target content is determined; and a marker corresponding to the target playback timestamp is differentially displayed in the controlling control.

According to one or more embodiments of the present disclosure, [example 27] provides an interactive information processing apparatus. The apparatus includes a correspondence establishment module and a content presentation module.

The correspondence establishment module, which is configured to establish a position correspondence between a display text generated based on a multimedia data stream and the multimedia data stream.

The content presentation module is configured to present the display text and the multimedia data stream corresponding to the display text based on the position correspondence.

In addition, although the operations are described in a particular order, this should not be construed as requiring that such operations should be performed in the particular order shown or in a sequential order. In certain circumstances, multitasking and parallel processing may be advantageous. Similarly, although implementation details are included in the preceding discussion, these should not be construed as limiting the scope of the present disclosure. Some features described in the context of separate embodiments may also be implemented in combination in a single embodiment. Conversely, various features described in the context of a single embodiment may also be implemented in multiple embodiments, individually, or in any suitable subcombination.

What is claimed is:

1. An interactive information processing method, comprising:
   establishing a correspondence between a multimedia data stream and a display text generated based on the multimedia data stream;
   presenting the multimedia data stream and the display text based on the correspondence; and
   in response to detecting a triggering operation triggering a first display content in the display text, adjusting, based on a timestamp corresponding to the first display content and the correspondence, the multimedia data stream to navigate to a playback position corresponding to the first display content;
   wherein the first display content comprises a text corresponding to speech in the multimedia data stream; and
   wherein the display text and the multimedia data stream are displayed on different display areas of a page respectively, and a display area occupied by the display text is not superimposed on a display area occupied by the multimedia data stream,
   wherein the interactive information processing method further comprises:
   acquiring an audio-video frame of the multimedia data stream, and determining a user identity of a speaking user corresponding to the audio-video frame;
   generating the display text corresponding to the multimedia data stream based on the user identity and the audio-video frame;
   acquiring a search content edited in a search content editing control, and acquiring a target content corresponding to the search content from the display text, each target content is the same as the search content;
   displaying the target content differentially in the display text, and marking the audio- video frame corresponding to the target content in a controlling control corresponding to the multimedia data stream; and
   displaying the display text and the multimedia data stream on a target page, and
   wherein displaying the display text and the multimedia data stream on the target page comprises:
   displaying a first display text and a third display text in the display text and a recording screen video in preset display regions on the target page, respectively, wherein content displayed in the first display text are characters generated based on an audio frame comprised in the audio-video frame, the third display text comprises at least one keyword or at least one key sentence, determining a content corresponding to the target content from the first display text in response to detecting that the target content in the third display text is triggered, and displaying the content differentially.

2. The method of claim 1, wherein acquiring the audio-video frame of the multimedia data stream, and determining the user identity of the speaking user corresponding to the audio-video frame comprise at least one of:
   determining the user identity of the speaking user by performing a voiceprint recognition on the audio frame; or
   determining a client identity of a client to which the audio frame belongs, and determining the user identity of the speaking user based on the client identity.

3. The method of claim 1, wherein generating the display text corresponding to the multimedia data stream based on the user identity and the audio-video frame comprises:
   obtaining a literal expression corresponding to the audio frame by performing a speech-to-text processing on the audio frame, and generating a first display text in the display text based on the literal expression and the user identity.

4. The method of claim 3, wherein obtaining the literal expression corresponding to the audio frame by performing the speech-to-text processing on the audio frame, and generating the first display text in the display text based on the literal expression and the user identity comprise:
   determining the literal expression corresponding to the audio frame, a timestamp currently corresponding to the audio frame and a user identity of a speaking user to which the audio frame belongs; and
   generating a second display content in the display text based on the user identity, the timestamp and the literal expression;
   wherein the second display content comprises at least one paragraph; and obtaining the literal expression corresponding to the audio frame by performing the speech-to-text processing on the audio frame, and generating the first display text in the display text based on the literal expression and the user identity comprise:

in a process of performing the speech-to-text processing based on the audio frame, in response to detecting that an interval duration between adjacent audio frames is greater than or equal to a preset interval duration threshold and a user identity of a latter audio frame of the adjacent audio frames is not changed, generating a next paragraph in the second display content based on the latter audio frame.

5. The method of claim 3, wherein generating the display text corresponding to the multimedia data stream based on the user identity and the audio-video frame comprises:
determining, based on the audio-video frame, the third display text in the display text to determine the content corresponding to the target content from the first display text in response to detecting that the target content in the third display text is triggered, and display the content differentially.

6. The method of claim 1, wherein generating the display text corresponding to the multimedia data stream based on the user identity and the audio-video frame comprises:
obtaining characters in the video frame by performing an image-text recognition on the video frame, and generating a second display text in the display text based on the characters and the user identity.

7. The method of claim 6, wherein obtaining the second display text in the display text by performing the image-text recognition on the video frame comprises at least one of:
in response to determining that the video frame comprises at least one uniform resource locator (URL) address, generating a third display content in the second display text based on the at least one URL address; or
in response to determining that the video frame comprises a character, determining a fourth display content in the second display text based on the character.

8. The method of claim 1, wherein generating the display text corresponding to the multimedia data stream based on the user identity and the audio-video frame comprises:
obtaining an original language type corresponding to audio information in the audio-video frame; and
generating the display text corresponding to the multimedia data stream based on the user identity, the audio-video frame and the original language type corresponding to the audio-video frame.

9. The method of claim 1, wherein generating the display text corresponding to the multimedia data stream based on the user identity and the audio-video frame comprises:
determining a target language type, and converting a text obtained by performing speech recognition on the audio-video frame, which corresponds to an original language type, to a literal expression corresponding to the target language type; and
generating the display text based on the literal expression corresponding to the target language type and the user identity.

10. The method of claim 9, wherein determining the target language type comprises:
acquiring a historical language type used by a current client, and determining the target language type based on the historical language type;
wherein the historical language type comprises at least one language type; and determining the target language type based on the historical language type comprises at least one of:
determining the target language type from the at least one historical language type based on a use frequency of each of the at least one historical language type;
using a language type set by the current client as the target language type; or
determining the target language type based on a login address of the current client.

11. The method of claim 1, wherein the correspondence comprises a timestamp synchronization association, and establishing the correspondence between the multimedia data stream and the display text generated based on the multimedia data stream comprises:
establishing the timestamp synchronization association between the display text and the multimedia data stream based on a timestamp of the display text and a timestamp of the multimedia data stream.

12. The method of claim 1, wherein presenting the multimedia data stream and the display text based on the correspondence comprises:
displaying differentially, in the display text, a display content corresponding to a multimedia data stream that is playing based on the correspondence.

13. The method of claim 1, wherein the multimedia data stream and the display text are displayed on a target page, and the target page further comprises a controlling control; and the method further comprises:
adjusting a currently displayed content of the display text and the multimedia data stream simultaneously based on the controlling control;
wherein an adjustment precision corresponding to the controlling control is greater than an adjustment precision of an adjustment control for adjusting a progress of a recording screen video in the multimedia data stream.

14. The method of claim 13, further comprising:
in response to detecting a triggering operation triggering the controlling control on the target page, acquiring a playback timestamp corresponding to the controlling control, adjusting the multimedia data stream to navigate to a playback position corresponding to the playback timestamp, and displaying a content of a display text of a video frame corresponding to the playback timestamp differentially in the display text.

15. The method of claim 1, further comprising at least one of:
in response to detecting a triggering operation for a playback progress of the multimedia data stream, acquiring a playback timestamp of the playback progress of the multimedia data stream corresponding to the triggering operation, and adjusting the display text to navigate to a display content corresponding to the playback progress of the multimedia data stream based on the playback timestamp and the correspondence;
in response to detecting a triggering operation for an editing control on a target page, displaying a permission editing list, and determining a user permission of each interactive user based on the permission editing list, wherein the user permission is used for representing an access permission of a user to a content presented on the target page, and the permission editing list comprises at least one user permission of an interactive user; or
in response to detecting a triggering operation triggering a sharing control on a target page, generating a target identity corresponding to the target page, and sending the target identity to a user to share with, to cause the user to share with to acquire the target page based on the target identity.

16. An electronic device, comprising:
at least one processor; and a storage apparatus, which is configured to store at least one program;

wherein the at least one program, when executed by the at least one processor, causes the at least one processor to implement the following:

establishing a correspondence between a multimedia data stream and a display text generated based on the multimedia data stream;

presenting the multimedia data stream and the display text based on the correspondence; and in response to detecting a triggering operation triggering a display content in the display text, adjusting, based on a timestamp corresponding to the display content and the correspondence, the multimedia data stream to navigate to a playback position corresponding to the display content;

wherein the display content comprises a text corresponding to speech in the multimedia data stream; and wherein the display text and the multimedia data stream are displayed on different display areas of a page respectively, and a display area occupied by the display text is not superimposed on a display area occupied by the multimedia data stream, wherein the at least one program, when executed by the at least one processor, further causes the at least one processor to implement the following:

acquiring an audio-video frame of the multimedia data stream, and determining a user identity of a speaking user corresponding to the audio-video frame;

generating the display text corresponding to the multimedia data stream based on the user identity and the audio-video frame;

acquiring a search content edited in a search content editing control, and acquiring a target content corresponding to the search content from the display text, each target content is the same as the search content;

displaying the target content differentially in the display text, and marking the audio-video frame corresponding to the target content in a controlling control corresponding to the multimedia data stream; and displaying the display text and the multimedia data stream on a target page, and wherein displaying the display text and the multimedia data stream on the target page comprises:

displaying a first display text and a third display text in the display text and a recording screen video in preset display regions on the target page, respectively, wherein content displayed in the first display text are characters generated based on audio frame comprised in the audio-video frame, the third display text comprises at least one keyword or at least one key sentence, determining a content corresponding to the target content from the first display text in response to detecting that the target content in the third display text is triggered, and displaying the content differentially.

17. A non-transitory storage medium, comprising computer-executable instructions which, when executed by a computer processor, are configured to implement the method of claim 1.

* * * * *